Nov. 2, 1954　　　L. E. ANSLEY　　　2,693,048
FISH LURE
Filed June 17, 1950
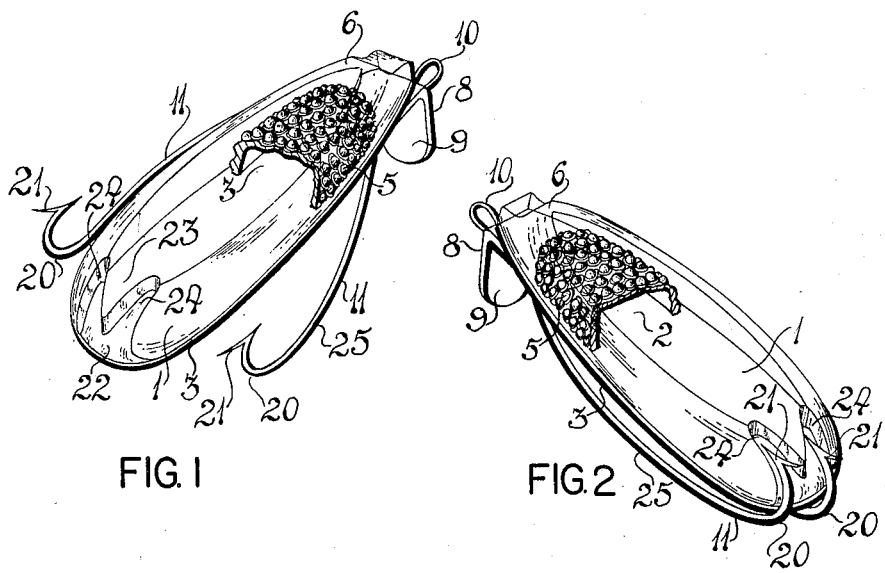
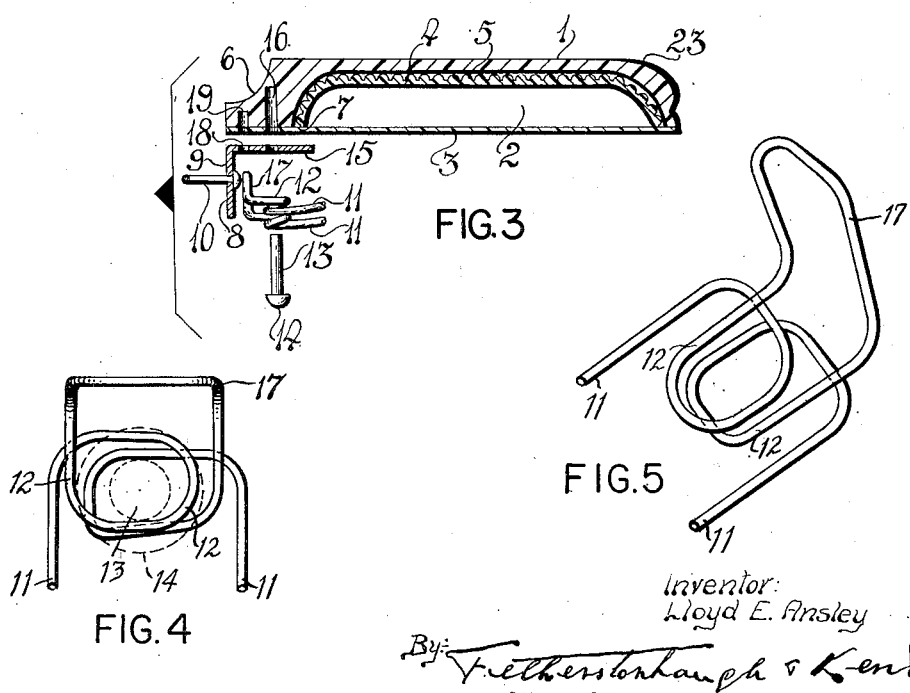
Inventor:
Lloyd E. Ansley
By: Featherstonhaugh & Kent
Their Atty's

United States Patent Office 2,693,048
Patented Nov. 2, 1954

2,693,048

FISH LURE

Lloyd E. Ansley, Brandon, Manitoba, Canada

Application June 17, 1950, Serial No. 168,713

2 Claims. (Cl. 43—42.41)

My invention relates to new and useful improvements in fish lures, an object of the invention being to provide a device of the character herewithin described whereby the hook elements are retracted and the barbed ends thereof shrouded until a fish strikes the lure at which time the hook elements extend thus hooking the fish.

A further object of the invention is to provide a device of the character herewithin described which incorporates novel means whereby the barbed ends of the hook elements can be retracted and stored so that the lure can be transported without the danger of the barbs piercing clothing, fingers, or the like.

Another object of my invention is to provide a device of the character herewithin described which due to the aforementioned retraction of the hook elements during trolling, prevents the accumulation and snagging upon the lure of weeds and other undesirable debris.

A still further object of my invention is to provide a device of the character herewithin described wherein the hook elements are ensured of engagement within the mouth of the fish.

Still another object of my invention is to provide a device of the character herewithin described wherein the hook elements are automatically extended as soon as the fish strikes irrespective of the position of the lure with relation to the mouth of the fish. By this is meant that the fish can strike or snap at the lure anywhere along the length thereof and still cause the aforementioned automatic extension of the hook elements.

Another object of my invention is to provide a device of the character herewithin described which includes a novel plastic body portion, the configuration and formation of which permits scintillation of light to occur thereby adding to the luring characteristics of the device.

A yet further object of my invention is to provide a device of the character herewithin described in which the hook retainers are formed within the rear end of the body portion being recessed so as to receive the barbed end of the hook element when retracted.

A still further object of my invention is to provide a device of the character herewithin described which is extremely simple in construction, economical in manufacture, and otherwise, well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a perspective view of my device with the hook elements extended.

Figure 2 is a perspective view of my device with the hook elements in the retracted position when trolling or when the lure is being transported.

Figure 3 is a longitudinal section of my device showing the construction of the body portion and showing the attachment of the hook elements to the body portion.

Figure 4 is an enlarged top plan view of the hook element per se with the barbs removed.

Figure 5 is an enlarged isometric view of the hook element per se with the barbs removed.

In the drawings like characters of reference indicate corresponding parts in the different figures.

Due to the extremely sharp nature of the barbed portion of fishing hooks normally incorporated in lures, extreme difficulty has been experienced in the storing and transportation of such lures in order to prevent the barb from entering the flesh or clothing or otherwise becoming entangled with miscellaneous objects. Furthermore, the average fish lure having extended barbs or conventional hooks, becomes a natural trap for weeds and other debris during trolling, the snagging of which make the lures useless as such.

The lure hereinafter to be described provides means whereby the barbed portions of the hook elements may be retracted within the body portion of the lure and, when in the retracted position, being shrouded to prevent the engagement thereof with other objects, particularly weeds, etc., yet which extend when a fish strikes.

Proceeding now to describe my invention in detail, reference to the accompanying drawings will show that I have provided an elongated body portion collectively designated 1 manufactured preferably from transparent plastic and having a concavity 2 formed within the body, said concavity being sealed by a base plate 3 also of transparent plastic.

The upper surface 4 of the concavity is pebbled with a plurality of blind drillings 5 and may be coloured as desired thereby increasing the scintillation effect of light impinging thereon thus increasing the luring characteristics of same as it is well known that fish are attracted by sudden flashes of light.

At the forward end 6 of the body portion and secured to the under surface 7 thereof is an angulated plate 8, the portion 9 whereof depends downwardly as illustrated and is provided with a loop 10 by which the lure may be secured to the conventional fishing line (not illustrated).

This angulated plate 8 serves a further purpose inasmuch as it provides means for the attachment of the hook elements collectively designated 11 as will hereinafter be described.

The pair of hook elements 11 illustrated, are formed preferably from a single piece of resilient stock and include inner portions 12 which are adapted to pass around the stem 13 of a pin 14 in the form of superimposed substantially horizontal loops, the pin, in turn, passing through the horizontal portion 15 of the aforementioned plate 8 and thence being embedded in a recess 16 formed within the forward end 6 of the body portion 1. The aforementioned inner ends 12 of the hook elements 11, after passing around the pin 14, terminate in an upwardly extending U-turn bend 17 which, in turn, is inserted through an aperture 18 within plate 8 and thence into a recess 19 also formed within the forward end 6 of the body portion 1.

The hook elements 11 being secured at the inner ends thereof as hereinbefore described, extend outwardly and rearwardly as clearly shown in Figure 1 upon each side of the body portion 1 terminating in distal ends 20 which turn upwardly and forwardly and which, in turn, are provided with conventional barbs 21. Due to the aforementioned resiliency of the hook elements, these will normally take the position illustrated in Figure 1.

A combination hook element keeper collectively designated 22 is formed within the upper rear surface 23 of the body portion and, in this embodiment, takes the form of a pair of recessed grooves 24 extending forwardly and divergently upon said upper surface.

The aforementioned recesses 24 should be formed deep enough to shroud the barbs 21 of the hook elements when same are in the retracted position shown in Figure 2 so as to prevent the undesirable engagement with hands, clothing or the like during transportation and to prevent weeds or the like from snagging the lure during trolling.

In operation, the body portion 1 is grasped between the thumb and forefinger of one hand with the forward end facing towards the palm of the hand. The distal ends 20 of the hook elements 11 are grasped by the forefinger and thumb of the other hand and urged towards the body portion 1 and upwardly against the resiliency of the elements. The position of the first mentioned hand is now altered in order to hold the hook elements against the sides of the lure whereupon the barbs 21 of the hook elements 11 may be drawn over the rear end 23 of the lure and entered into the hook element keepers 24 as clearly shown in Figure 2.

In this position, the lure is ready for use and it will be seen from Figure 2 that the portions 25 of the elements curve under the lure and are spaced therefrom, the elements being under spring tension due to the resilient nature thereof and to the engagement of the barbs 21 within the keepers 24.

A fish striking at the lure will grasp the lure along the length thereof between its jaws thus pressing the portions 25 of the elements towards the underside of the lure which causes release of the barbs from the keepers 24 and enables the elements to spring outwardly and downwardly taking the position shown in Figure 1, thereby causing the barbs 21 to engage with the inner mouth cavity of the fish and causing an automatic strike to take place.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A fish lure comprising in combination an elongated body portion characterised by the provision of two recesses on the underside thereof, one behind the other, a pair of resilient hook elements secured adjacent the forward end of said body portion, said hook elements being formed on the free ends of a piece of resilient wire stock, said piece of wire stock including a substantially U-turn bend midway between the ends thereof, a substantially horizontal loop formed in each of said hook elements adjacent said U-turn bend, said horizontal loops being superimposed one above the other and pin means extending through said loops and engaging one of said recesses on the underside of said body portion, said U-turn bend engaging the other of said recesses formed in the underside of said body portion, said hook elements normally being biased downwardly and outwardly from said forward ends, and said body portion having a formation constituting hook element keeper means upon the rear end thereof to retain releasedly said hook elements under tension adjacent the sides of said body portion, said hook elements when retained by said keeper means being bowed away from and below said sides between said hook element keeper means and the points of attachment of said hook element to said body and said hook elements being adapted to be released from said keeper means when pressure is applied to said bowed portions in a direction towards said body portion.

2. The device according to claim 1 in which said formation takes the form of a pair of recesses provided within the upper surfaces of said body adjacent the rear end thereof, the depth of said recesses being sufficient to shroud the barbs of said hook elements and to restrain said hook elements against outward spring bias.

References Cited in the file of this patent

UNITED STATES PATENTS

| Number | Name | Date |
|---|---|---|
| 886,794 | Gilmore | May 5, 1903 |
| 1,197,820 | Guise | Sept. 12, 1916 |
| 1,232,804 | Jamison | July 10, 1917 |
| 1,723,193 | McLaughlin | Aug. 6, 1929 |
| 1,873,289 | Clark | Aug. 23, 1932 |
| 2,163,378 | Horvath | June 20, 1939 |
| 2,307,200 | Cullerton | Jan. 5, 1943 |
| 2,424,096 | Jonchan | July 15, 1947 |
| 2,503,620 | Larson | Apr. 11, 1950 |
| 2,569,119 | Tallaksen | Sept. 25, 1951 |